United States Patent [19]

Barda et al.

[11] Patent Number: 4,468,481

[45] Date of Patent: Aug. 28, 1984

[54] FLAME RETARDANT POLYURETHANE MODIFIED POLYISOCYANURATE

[75] Inventors: Henry J. Barda, North Brunswick; Burton J. Sutker, Edison; William J. Eldridge, Berkeley Heights, all of N.J.

[73] Assignee: Ethyl Corporation, Richmond, Va.

[21] Appl. No.: 450,206

[22] Filed: Dec. 16, 1982

[51] Int. Cl.³ .............................................. C08G 18/28
[52] U.S. Cl. .................................. 521/171; 521/906; 560/83
[58] Field of Search .............. 521/171, 172, 906, 117; 528/60, 73, 65; 560/83

[56] References Cited

U.S. PATENT DOCUMENTS

| | | | |
|---|---|---|---|
| 3,285,995 | 11/1966 | Nametz et al. | 560/83 |
| 3,431,223 | 3/1969 | Reymore et al. | 560/83 |
| 3,454,530 | 7/1969 | Case et al. | 260/75 |
| 3,565,812 | 2/1971 | Anderson et al. | 252/182 |
| 3,573,215 | 3/1971 | Nametz et al. | 560/83 |
| 3,585,185 | 6/1971 | Levis, Jr. et al. | 260/210 |
| 3,639,541 | 1/1972 | Austin et al. | 260/952 |
| 3,639,542 | 2/1972 | Pizzini et al. | 260/952 |
| 3,642,646 | 2/1972 | Marcus | 252/182 |
| 3,676,376 | 7/1972 | Svoboda et al. | 260/2.5 |
| 3,929,866 | 12/1975 | Baldino et al. | 560/83 |
| 3,931,065 | 1/1976 | Ashida et al. | 521/171 |
| 3,989,653 | 11/1976 | Baldino et al. | |
| 4,264,745 | 4/1981 | Foucht | 521/171 |

FOREIGN PATENT DOCUMENTS 993451  7/1976  Canada .............................. 260/472.3

*Primary Examiner*—John Kight, III
*Assistant Examiner*—Kriellion Morgan
*Attorney, Agent, or Firm*—Donald L. Johnson; John F. Sieberth; Teresa M. Stanek

[57] ABSTRACT

A flame retardant polyurethane-modified polyisocyanurate foam composition containing a flame retardant amount of a normally liquid flame retardant polyol ester. The polyol ester is prepared by a process comprising reacting a halogen containing anhydride of a dicarboxylic acid or a mixture of said anhydrides with 2 to about 10 moles of an aliphatic diol or mixture of diols per mole of said anhydride to obtain a substantially fully esterified halogen containing product.

9 Claims, No Drawings

FLAME RETARDANT POLYURETHANE MODIFIED POLYISOCYANURATE

BACKGROUND OF THE INVENTION

1. Field of the Invention

This invention relates to a flame retardant polyurethane-modified polyisocyanurate. More particularly, this invention relates to the use of a normally liquid flame retardant polyol ester in a polyurethane-modified polyisocyanurate composition.

2. Description of the Prior Art

One of the efforts which the rigid urethane foam industry has capitalized on in recent years has been the development of a rigid foam which has flame retardance and generates less smoke when it does burn. The rigid foam which has gained the greatest attention and commerical acceptance is polyisocyanurate foam.

Polyisocyanurate refers to isocyanate polymer trimer groups formed by the reaction between isocyanate groups. Although chemically related to polyurethanes, the products known commercially as polyisocyanurates, isocyanurates, or trimer foams differ from ordinary polyurethanes in that the polymer backbone contains the more thermally stable isocyanurate ring structure, in addition to whatever other chemical linkages may be present. The isocyanurate ring structure imparts a greater degree of thermal stability and lower combustibility characteristics to the finished product than those ordinarily obtainable in polyurethanes.

The polyisocyanurate linkage is obtained by trimerization of isocyanate groups in the presence of a trimerization catalyst:

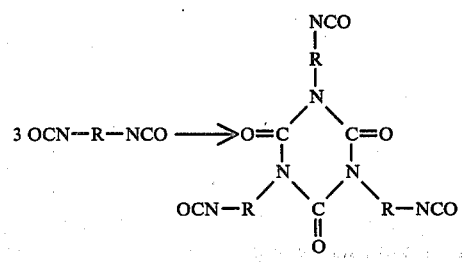

The reactants may also contain blowing agents. These foams have excellent resistance to deformation even at temperatures of up to 250° C. and much more prolonged resistance to fire than conventional polyurethane foams. Polyisocyanurate foams are essentially closed-cell with a nominal density of two to ten pounds per cubic foot.

Polyisocyanurate foams are characterized by the absence of labile hydrogens in the polymer structure and by the highly cyclic structure. These characteristics provide the resulting foams with high thermal stability and flame retardance. However, these polymers, having a very high cross-link density, are too friable to be of practical use. Considerable effort has been directed toward modifying these foams to make them acceptable for commercial application. Oftentimes this modification adversely affects the thermal stability and the flammability of these foams. The properties of modified and unmodified foams are also generally adversely affected by flame retardant additives.

One method of modifying polyisocyanurate foams is by adding as elasticizing component. By adding a polyol as an elasticizing agent to the initial reactants then a polyurethane-modified polyisocyanurate foam results. These are sometimes referred to as a urethane-modified isocyanurate foam or a polyurethane-polyisocyanurate hybrid foam.

Polyisocyanurate foams contain only isocyanurate units. There are no polyol components present in the foam. These foams tend to be highly friable and generally require little or no additional flame retardant components. Polyurethane-modified polyisocyanurate foams, on the other hand, contain a polyol component.

These polyurethane-modified polyisocyanurate foams oftentimes have an isocyanate index of 160–200, but isocyanate indexes up to 600 or even 1,000 are possible. These polyurethane-modified isocyanurate foams have improved friability at the cost of decreased thermal stability and increased flammability. Thus, a flame retardant component is generally required.

Copending application U.S. Ser. No. 385,783, filed June 7, 1982 claims a normally liquid flame retardant polyol prepared by a process comprising reacting a halogen containing anhydride of a dicarboxylic acid or a mixture of said anhydrides and about 2–10 moles of an aliphatic diol or mixture of diols per mole of said anhydride to obtain a substantially fully esterified halogen containing product in which the acid number does not exceed 10 with the optional removal of unreacted diol during the course of the reacting or subsequent to the reacting.

This application claims the use of this flame retardant polyol composition in polyurethane-modified polyisocyanurate foams.

SUMMARY OF THE INVENTION

It has now been discovered that a normally liquid flame retardant polyol ester prepared by a process comprising reacting a halogen containing anhydride of a dicarboxylic acid or a mixture of said anhydrides with 2 to about 10 moles of an aliphatic diol or mixture of diols per mole of said anhydride to obtain a substantially fully esterified halogen containing product in which the acid number does not exceed 10 with the optional removal of unreacted diol during the course of the reacting or subsequent to the reacting is an excellent flame retardant in polyurethane-modified polyisocyanurate foams.

DESCRIPTION OF THE PREFERRED EMBODIMENT

Typical reactants used in preparing a polyurethane-modified polyisocyanurate foam include an organic polyisocyanate, a trimerization catalyst, a urethane-promoting catalyst, one or more polyols and a blowing agent. Optional ingredients include a surfactant, a modifier, a flame retardant and the like. The isocyanate reacts with an equivalent of hydroxyl to form urethane functions, while the excess isocyanate (isocyanate index greater than 100%) trimerizes to isocyanurate functions.

Typical aliphatic polyisocyanates include hexamethylenediisocyanate, isophoronediisocyanate, dicyclohexylmethanediisocyanate, methyl cyclohexanediisocyanate and the like. Typical aromatic polyisocyanates include tolylenediisocyanate (2,4-and/or 2,6-isomer), polymethylene polyphenylisocyanate, diphenylmethanediisocyanate, bitolylene-diisocyanate, naphthylenediisocyanate (such as 1,5-naphthylenediisocyanate), triphenylmethanetriisocyanate, dianisidinediisocyanate, xylyenediisocyanate, tri(isocyanatephenyl)thiophosphate, and the like.

Isocyanate-trimerization catalysts are used in the process of the invention. It is preferable to use a catalyst which has high activity for accelerating trimerization since the reaction for preparing the foam is usually initiated at room temperature and is preferably completed within a short time such as 1–5 minutes. The isocyanate-trimerization catalysts which allow the composition to solidify at 100° C. within 10 minutes are preferred.

Typical isocyanate-trimerization catalysts include (a) tertiary amines such as triethylamine, N,N',N"tris(-dimethylaminopropyl)hexahydrotriazine, 2,4,6-tris(-dimethylaminomethyl)phenol, tetramethyl ethylenediamine, diazabicycloalkane, mannich bases produced by the reaction of formaldehyde, dimethylamine and phenol or phenol having an alkyl substituent, cycloamidines and the like; (b) mixture of a tertiary amine and a promotor, such as ethanol, mono N-substituted carbamic acid esters, water, aliphatic aldehydes, tertiary imines, benzoyl peroxide, ethylene-carbonate, α-diketones (e.g. diacetyl) and various epoxy compounds; (c) tertiary phosphines such as triethyl phosphine; (d) alkali metal salts of imides such as potassium phthalimide, sodium succinimide and the like; (e) organic onium compounds such as tetraethyl ammonium hydroxide, benzyl triethylammonium hydroxide, tetraethyl phosphonium hydroxide, trimethyl sulfonium hydroxide, (f) ethyleneimines such as N-butyl ethyleneimine, 2-hydroxyethyl ethyleneimine and the like; (g) metal salts of carboxylic acid such as potassium acetate, potassium 2-ethylhexanoate, lead 2-ethyl-hexanoate, sodium benzoate, potassium naphthenate, tin octanoate and the like; (h) basic inorganic compounds such as potassium carbonate, calcium hydroxide, barium oxide, potassium hydroxide, sodium hydroxide and the like; (i) alcoholates and phenolates such as sodium methoxide, potassium phenolate, sodium trichlorophenolate and the like; (j) Ti- and Sb-compounds such as tetra-butyl titanate, tri-n-butyl antimonyoxide and the like; (k) Friedel-Crafts catalysts such as zinc chloride, tin chloride, ferric chloride, antimony pentachloride, aluminum chloride, boron trifluoride and the like; (l) alkali metal complexes such as alkali metal complexes salicylaldehyde, acetyl-acetone, O-hydroxyacetophenone or quinizarine, alkali metal complexes of tetra-valent boron compounds and the like.

These catalysts are generally used in a quantity of about 0.001 to 10% by weight, based on the quantity of compounds with a molecular weight of between 62 and 10,000 which contain at least two hydrogen atoms which are reactive with isocyanates.

It is not always necessary to add a surfactant (emulsifiers and foam stabilizers) in the process of the invention but it is preferable to add one for forming a desirable foam structure. The surfactants include nonionic surfactants, anionic surfactants and cationic surfactants. It is preferable to use organopolysiloxane-polyoxyalkylene copolymers. The emulsifiers used can be e.g. the sodium salts of ricinoleic sulphonic acids or of fatty acids or salts of fatty acids with amines such as oleic acid diethylamine or stearic acid diethanolamine. Alkali metal or ammonium salts of sulphonic acids, e.g. of dodecylbenzene sulphonic acid of dinaphthylmethanedisulphonic acid or of fatty acids such as rincinoleic acid or of polymeric fatty acids can also be used as surface active additives.

The foam stabilizers used are mainly water-soluble polyether siloxanes. The structure of these compounds is generally such that a copolymer of ethylene oxide and propylene oxide is attached to a polydimethylsiloxane groups. Such foam stabilizers have been described e.g. in U.S. Pat. No. 2,764,565.

It is also possible to use other additives if desirable. Typical additives include flame-retardants such as phosphorus or halogen-containing organic compounds, halogencontaining resins, antimony oxide, zinc oxide, aluminum hydroxide and the like, coloring agents such as pigments and dyes and inorganic fillers such as talc, diatomaceous earth, graphite, glass fiber and other inorganic fillers.

Reaction retarders can also be used according to the invention, e.g. substances which are acid in reaction such as hydrochloric acid or organic acid halides; known cell regulators such as paraffins or fatty alcohols or dimethylpolysiloxanes can also be used as well as pigments or dyes and flame retarding agents known per se such as tris-chloroethylphosphate or ammonium phosphate and ammonium polyphosphate; other substances which can be added include age resistors and stabilizers against weathering, plasticizers, fungistatic and bacteriostatic substance and fillers such as barium sulphate, kieselguhr, carbon black or whiting.

The modified polyisocyanurates also include prepolymers having terminal NCO groups produced by reacting a polyol with an equivalent or excess amount of polyisocyanate; such as polyisocyanates having urethane linkages which are produced by reacting trimethylolpropane with tolylenediisocyanate at a molar ratio of 1:3 or more; and prepolymers produced by reacting a small amount of a polyol with a polymeric isocyanate in the conventional process. The organic polyisocyanates which are preferably used in the process of this invention are aromatic polyisocyanates and modified products thereof.

Water and/or readily volatile organic substances are used as blowing agents. The blowing agents used in the process of the invention include the conventional blowing agents used for the preparation of urethane foam and isocyanurate foam. Typical blowing agents include (a) inert solvents having a low boiling point such as trichlorofluoromethane, dichlorodifluoromethane, dibromotetrafluoroethane, trichlorotrifluoroethane, methylenechloride, pentane, trichloroethane, benzene, n-hexane and the like; (b) compounds which generate carbon dioxide by reacting with an isocyanate such as water, hydrated water containing compounds, nitroalkanes, aldoximes, acid amides, enolizable compounds and the like; (c) compounds which generate gas by thermal decomposition by the heat or reaction provided in the formation of a foam such as sodium bicarbonate, ammonium bicarbonate, azobisisobutyronitrile, azoaminobenzol, dinitrosopentamethylenetetramine and the like. The preferable blowing agents are the compounds included in the group (a) and the optimum blowing agent is trichloromonofluoromethane.

Several processes are available for preparing polyurethane-modified polyisocyanurate foam. In one method an organic polyisocyanate is admixed with a trimerization and a urethane promoting catalyst, a blowing agent, the flame retardant polyol of the present invention and a surfactant and the mixture is foamed. The trimerization and urethane promoting catalysts may be the same or different compounds. In another process a polyurethane-modified polyisocyanurate foam is prepared either by blending a previously modified polyisocyanate produced by reacting a polynuclear polyisocyanate with 2 modifier, trimerization catalyst, urethane promoting catalyst, a blowing agent, a surfactant, a flame retardant, etc. or by blending and foaming an unmodified polynuclear polyisocyanate, a modifier, a trimerization catalyst, urethane promoting catalyst, a blowing agent, a surfactant, a flame retardant, etc. at the same time. This latter process is generally referred to as the one shot process.

A third method involves a polyol having isocyanurate rings, a polyisocyanate, a blowing agent, a surfactant and an urethane-forming catalyst which are blended and foamed along with the flame retardant of the present invention.

The flame retardant polyol of the present invention is a normally liquid flame retardant polyol prepared by a process comprising the esterification of a halogen containing anhydride of a dicarboxylic acid or a mixture of said anhydrides and 2 to about 10 moles of an aliphatic diol or mixture of diols per mole of said anhydride to obtain a substantially fully esterified halogen containing product in which the acid number does not exceed 10 with the optional removal of unreacted diol during the course of the reacting or subsequent to the reacting.

Halogen containing anhydrides of dicarboxylic acids used in preparing the reactive flame retardant polyol of the present invention have the structure:

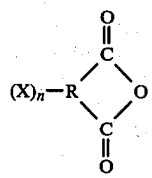

wherein R is a hydrocarbon group having the valence n+2 and is selected from the group consisting of benzene groups, naphthalene groups and alicyclic hydrocarbon groups containing 5 to 10 carbon atoms, X is selected from the group consisting of bromine and chlorine and n is an integar from 1 to 8. Typical halogenated dicarboxylic anhydrides include:
  3-chlorophthalic anhydride,
  4-bromophthalic anhydride,
  3,6-dibromophthalic anhydride,
  tetrabromophthalic anhydride,
  tetrachlorophthalic anhydride,
  1,4,5,6,7,7-hexachlorobicyclo(2.2.1)-5-heptene-2,3-dicarboxylic anhydride,
  5,6,7,8,9,9-hexachloro-1,2,3,4,4a5,6,8a-*octahydro*- 5,8-methano-2,3-naphthalene dicarboxylic anhydride,
  1,2,3,4,5,6,7,7-octachloro-3,6-methano-1,2,3,6-tetrahydrophthalic anhydride,
  1,4-dichloro-2,3-naphthalene-dicarboxylic anhydride and
  1,4-dibromo-2,3-naphthalene-dicarboxylic anhydride.

Mixtures of any of the above anhydrides may also be employed as well as mixtures of the above anhydrides and nonhalogenated anhydrides. Preferably, the halogen containing anhydride is tetrahalophthalic anhydride. More preferably, the halogen containing anhydride is tetrabromophthalic anhydride.

It has also been found to be advantageous to include in the reaction mixture a basic material in an amount sufficient to neutralize any residual inorganic acid present in the halogen containing anhydride. An aqueous solution of any material which has a pH greater than about 8 may be employed. Representative materials include, for example, alkali metal and alkaline earth metal hydroxides; carbonates and bicarbonates, such as sodium hydroxide, sodium carbonate, sodium bicarbonate, potassium hydroxide, and calcium carbonate; ammonium hydroxide; and salts such as sodium acetate. Of these, preferred results have been achieved when sodium acetate is employed in the reaction mixture.

Aliphatic diols include alkylene glycols and linear and branched polyether glycols having a plurality of ether linkages containing two hydroxyl groups and being substantially free from functional groups other than hydroxyl groups. Among the diols which are useful in the practice of this invention are ethylene glycol, propylene glycol, butylene glycol, 1,6-hexane diol, and the like.

Preferred diols are the polyether glycols. These are a well-known class of diols and have the formula

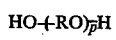

wherein p is an integer from two to about 100 and R is a divalent aliphatic hydrocarbon group containing about 2 to about 4 carbon atoms. More preferably, R is 2 or 3 carbon atoms. In a highly preferred embodiment R is —CH$_2$CH$_2$— and p is an integer from 2 to 10.

Polyether glycols include polyoxpropylene, polyoxypropyleneoxyethylene and polyoxybutylene diols. The preferred diols include diethylene glycol, dipropylene glycol, triethylene glycol and tripropylene glycol. Any combination or mixture of diols may be used in the practice of the present invention. The most preferred aliphatic diol is triethylene glycol.

The amount of aliphatic diol used in the practice of the present invention is about 2–10 moles of aliphatic diol or mixture of aliphatic diols per mole of halogen containing anhydride. Preferably, about 3 to 5 and most preferably about 4 moles of aliphatic diol are used.

Although not required, excess diol can optionally be removed during the course of the reaction or subsequent to the completion of the reaction. Excess diol is advantageous because it assists in pushing the esterification to completion.

The reaction should be carried out at a temperature high enough to allow the reaction to proceed, yet not so high as to cause degradation of the reactants or products. A useful range in which to experiment is about 100° C. –250° C. The preferred temperature range is from about 120° C. to about 190° C. At temperatures below about 120° C. very long reaction times are required, whereas, at temperatures above about 190° degradation of the reactants or products may occur. A more preferred temperature range is from about 175° C. to about 190° C.

The reaction is considered complete when the acid number approaches zero. However, it is unnecessary to take the reaction to this point and an acid number of 0 to 10mg KOH/g is generally adequate. Low acid numbers are preferred since this minimizes undesirable side reactions and maximizes the number of hydroxy groups able to bind with the —NCO functions of the polyisocyanate. Completion of the reaction of the present invention is determined by periodically removing samples from the reaction mixture and titrating with base.

In addition to using excess diol to assist in pushing the reaction to completion, products formed as a result of the reaction can be removed to increase reaction rate.

Water is formed along with the halogen containing polyol ester of the present invention. By removing water an increase in reaction rate can be achieved. There are at least two ways to remove the water from the reaction system. One way is to evaporate the water by sweeping it out of the reaction system using an inert gas such as nitrogen. Some diol is also removed from the reaction system by this technique. Another method is to azeotropically remove the water using an inert water immiscible solvent. The solvent selected also must possess the proper boiling point to bring the system to the correct temperature. Typical solvents include naphtha, xylene, toluene, cumene, heptane, decane, and the like.

The reactants may be added concurrently or sequentially. The order of mixing the reactants does not affect the final product obtained.

The ester and halogen containing polyol as described above is useful in making flame retardant, self-extinguishing polyurethane-modified polyisocyanurate compositions.

The quantity of flame retarding agents added to the reaction mixture for producing the foam is calculated so that the reaction mixture contains between about 1 weight percent and about 60 weight percent of the flame retardant polyol ester based on the weight of the reactants excluding the weight of the blowing agent. Preferably, the flame retardant polyol ester is present in the range of about 5 weight percent to about 25 weight percent based on the weight of the reactants excluding the weight of the blowing agent.

Certain specific examples are provided herein for purposes of illustration only and are not intended to be limiting in any manner unless otherwise specified. The evaluations of the polyurethane-modified polyisocyanurate forms were made in accordance with the following methods.

EXAMPLE 1

Preparation of Ester and Halogen-Containing Polyol

Into a 2 liter reaction flask provided with a Dean and Stark trap was charged 3.4 g sodium acetate and 901.0 g (6.0 moles) triethylene glycol. Into the Dean and Stark trap was added 15.0 g of naptha. The mixture was heated to 130° C. and 695.4 g (1.5 moles) of tetrabromophthalic anhydride was added over a 15 minute period. The reaction mixture was heated to 190° and 24.5 g of naphtha was added to maintain reflux. The lower water layer in the Dean and Stark trap was periodically drained until 27.5 ml was collected. At this point the acid number of the reaction mixture was 2.8. The Dean and Stark trap was replaced by a still head, the pressure was reduced to 2.8-4.8 cm of mercury. The reaction mixture was distilled to a residue of 1,101.2 g. The product was found to have an acid number of 0.0, a hydroxyl number of 195.6, a bromine content of 41.43%, and a Brookfield viscosity of 746 cps at 25° C.

Two other batches following the above procedure were run, and the products of all three batches were blended to give a product with a hydroxyl number of 195.6 and a bromine content of 41.11%.

EXAMPLES 2-9

Performance Data

Table 1 contains data on a set of hand mixer polyurethane-modified polyisocyanurate foam compositions containing the flame retardant polyol from Example 1. Other ingredients used in preparing the foam include:

Terate 203, a trademark of Hercules, Inc., which is an aromatic polyester polyol with a hydroxyl number of 315.

Poly-G 71-530, a trademark of Olin Chemicals, which is a sucrose-amine type polyether polyol with a hydroxyl number of 530±10.

Antiblaze 80, a trademark of Mobil Oil Corporation, which is a mixture of $\beta$-chloropropyl phosphate esters.

Dow Corning 193, a registered trademark of Dow Corning Corporation, which is a nonhydrolyzable silicone glycol copolymer surfactant designed for use in producing all types of rigid urethane foam.

Polycat 8, a trademark of Abbott Laboratories, refers to N,N'-dimethylcyclohexylamine, a tertiary amine catalyst. DABCO TMR-2 a trademark of Air Products and Chemicals, Inc., refers to a mixture of quaternary ammonium salts used to catalyze the formation of polyisocyanurates.

Freon 11B, available from E. I. duPont DeNemours and Co., Inc., refers to trichlorofluoromethane, a blowing agent.

PAPI 135, a trademark of Upjohn Polymer Chemicals, refers to a polymethylene polyphenylisocyanate with an average functionality of 2.7.

The polyols, phosphate when present, surfactant, blowing agent, amine and quaternary ammonium salt catalysts were weighted and charged into a plastic container. The mixture was blended for 45 seconds with an electric mixer. The isocyanate component was then weighed and added to the mixture which was blended for 15 seconds. The mixture was then transferred to a cardboard box where the foam was allowed to rise. The entire procedure was carried out at room temperature.

Two tests were used to evaluate the flame retardant properties of these polyurethane foam compositions. They were the ASTM D-1692 and the Oxygen Index Test. ASTM D-1692 is a small scale horizontal laboratory screening procedure for measuring the rate of burning or extent of burning of rigid or flexible cellular plastics such as polyurethane foams. The Oxygen Index Test is defined as the minimal volume fraction of oxygen in a slowly rising gaseous atmosphere that will sustain the candlelike burning of a stick of polymer. The higher the Oxygen Index of a composition, the more flame retarded it is.

The composition of each foam is given in parts by weight.

TABLE 1

|  | Example | | | | | | | |
| --- | --- | --- | --- | --- | --- | --- | --- | --- |
|  | 2 | 3 | 4 | 5 | 6 | 7 | 8 | 9 |
| Polyol from Example 1 | — | — | — | 50 | 50 | 50 | 100 | 100 |
| Terate 203 | 50 | 50 | 50 | — | — | — | — | — |
| Poly-G 71-530 | 50 | 50 | 50 | 50 | 50 | 50 | — | — |
| Antiblaze 80 | — | — | 12.6 | — | — | 11.4 | — | — |
| Dow Corning-193 | 3.0 | 3.0 | 3.0 | 3.0 | 3.0 | 3.0 | 3.0 | 3.0 |
| Polycat 8 | 0.5 | 0.5 | 0.5 | 0.5 | 0.5 | 0.5 | 0.5 | 0.5 |

TABLE 1-continued

|  | Example | | | | | | | |
|---|---|---|---|---|---|---|---|---|
|  | 2 | 3 | 4 | 5 | 6 | 7 | 8 | 9 |
| DABCO TMR-2 | 2.0 | 2.0 | 2.0 | 2.0 | 2.0 | 2.5 | 2.0 | 2.0 |
| Freon 11B | 41 | 47 | 43 | 37 | 43 | 39 | 28 | 31 |
| PAPI 135 | 159 | 199 | 159 | 133 | 173 | 133 | 74.5 | 93 |
| Isocyanate index, % | 160 | 200 | 160 | 160 | 200 | 160 | 160 | 200 |
| Density, lbs./cu. ft. | 1.69 | 1.77 | 1.79 | 1.73 | 1.76 | 1.75 | 2.30 | 1.97 |
| Oxygen Index | 21.0 | 21.8 | 23.0 | 22.6 | 23.2 | 24.7 | 25.9 | 27.2 |
| D-1692 burn rate, in./min. | 2.6 | 1.6 | 1.3 | 1.6 | 1.3 | 0.9 | 0.8 | 1.1 |
| D-1692 Extent of Burn, in. | 1.8 | 1.2 | 0.9 | 1.0 | 0.7 | 0.6 | 0.6 | 0.4 |

As indicated in Table 1 the polyurethane-modified polyisocyanurate foam compositions which contain a larger amount of flame retardant polyol from Example 1 demonstrate good flame retardant properties when evaluated by the Oxygen Index and ASTM D-1692 burn tests.

EXAMPLE 10

Preparation of Ester and Halogen Containing Polyol

Into a one liter reaction flask provided with a Dean and Stark trap was charged 2.3 sodium acetate and 424.5 g (4.0 moles) diethylene glycol. Into the Dean and Stark trap was added 15 g of naptha. The reaction mixture was heated to 130° C. and 463.6 g (1.0 mole) of tetrabromophthalic anhydride was added over a 10 minute period. The contents were then heated to 190° C. and 17.2 g of naptha was added to maintain reflux. The lower water layer in the Dean and Stark trap was periodically drained until 291.0 ml was collected. At this point the acid number of the reaction mixture was 6.8. The Dean and Stark trap was replaced by a still head, and the pressure reduced to 7.9–8.4 cm of mercury. The content was distilled to a residue of 660.7 g. The product was found to have an acid number of 5.9, a hydroxyl number of 172.8, a bromine content of 45.99% and a Brookfield viscosity of 1,460 cps at 25° C.

EXAMPLE 11

Preparation of Ester and Halogen Containing Polyol

Into a 500 ml reaction flask provided with a Dean and Stark trap was charged 2.3 g of sodium acetate, 472.7 g (4 moles) of 1,6-hexanediol and 15.0 g naptha. The mixture was heated to 130° C. and 463.6 g (10 mole) of tetrabromophthalic anhydride was added over 30 minutes. It was then heated to 190° C. and 32.7 g of naptha was added to maintain reflux. When 18.0 ml of lower aqueous layer was collected in the Dean and Stark trap, the acid number of the reaction mixture was 0.4. At this point the Dean and Stark Trap was replaced by a still head and the system was evacuated for distillation. The contents were distilled to a residue of 683.9 g. The product was found to have a hydroxyl number of 199,8, a bromine content of 45.42%, and a Brookfield viscosity of 2,184 at 25° C.

EXAMPLES 12-13

Performance Data

Table 2 contains data on a set of hand mixed polyurethanemodified polyisocyanate foams containing the flame retardant polyols from Examples 10 and 11. These foams were prepared in the same manner as those of Examples 2 through 9.

TABLE 2

|  | Example | |
|---|---|---|
|  | 12 | 13 |
| Polyol from Example 10 | 60.0 | — |
| Polyol from Example 11 | — | 60.0 |
| Poly-G 71-530 | 40.0 | 40.0 |
| Dow Corning-193 | 3.0 | 3.0 |
| Polycat 8 | 0.5 | 0.5 |
| T-12 | 0.03 | — |
| DABCO TMR-2 | 2.0 | 2.0 |
| Freon 11B | 30.0 | 30.0 |
| PAPI 135 | 107.0 | 111.0 |
| Isocyanate Index, % | 160.0 | 160.0 |
| Density, lbs./cu. ft. | 2.0 | 1.7 |
| D-1692 burn rate in./min. | 1.2 | 1.3 |
| D-1692 extent of burn, inches | 0.5 | 0.4 |

As indicated in Table 2, the polyurethane-modified polyisocyanurate foam compositions which contain the flame retardant polyols from Examples 10 and 11 demonstrate good flame retardant properties when evaluated by the ASTM D-1692 burn test.

We claim:

1. A flame retardant polyurethane-modified polyisocyanurate foam composition prepared by a process comprising reacting an organic polyisocyanate, a trimerization catalyst, a blowing agent and a flame retardant amount of a normally liquid flame retardant polyol ester said polyol ester being prepared by a process comprising reacting a halogen containing anhydride of a dicarboxylic acid or a mixture of said anhydrides with 2 to 10 moles of an aliphatic diol or mixture of diols per mole of said anhydride to obtain a substantially fully esterified halogen containing product in which the acid number does not exceed 10 with the optional removal of unreacted diol during the course of the reacting or subsequent to the reacting.

2. A polyurethane-modified polyisocyanurate foam composition, as recited in claim 1, wherein said anhydride is tetrahalophthalic anhydride.

3. A polyurethane-modified polyisocyanurate foam composition, as recited in claim 2, wherein said tetrahalophthalic anhydride is tetrabromophthalic anhydride.

4. A polyurethane-modified polyisocyanurate foam composition, as recited in claim 3, wherein said diol is polyalkylene glycol having the formula:

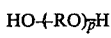

wherein p is an integer from two to about 100 and R is a divalent aliphatic hydrocarbon group containing about 2 to about 4 carbon atoms.

5. A polyurethane-modified polyisocyanurate foam composition, as recited in claim 4, wherein said diol is triethylene glycol.

6. A polyurethane-modified polyisocyanurate foam composition, as recited in claim 5, wherein 4 moles of said triethylene glycol are reacted per mole of said tetrabromophthalic anhydride.

7. A polyurethane-modified polyisocyanurate foam composition, as recited in claim 5, wherein about 2 moles of triethylene glycol per mole of tetrabromophthalic anhydride are removed during or subsequent to the reacting.

8. A polyurethane-modified polyisocyanurate foam composition, as recited in claim 1, wherein the flame retardant polyol ester is present in the range of about 1 weight percent to about 60 weight percent of the reactants excluding the weight of the blowing agent.

9. A polyurethane-modified polyisocyanurate foam composition, as recited in claim 8, wherein a surfactant is also added.

* * * * *